(12) United States Patent
Köstler et al.

(10) Patent No.: US 11,427,269 B2
(45) Date of Patent: Aug. 30, 2022

(54) ARTICULATED/SWIVEL JOINT FOR THE ARTICULATED CONNECTION BETWEEN A REAR SECTION AND A FRONT SECTION OF A CONSTRUCTION MACHINE

(71) Applicant: Hamm AG, Tirschenreuth (DE)

(72) Inventors: Gerd Köstler, Tirschenreuth (DE); Stefan Reber, Weiden (DE)

(73) Assignee: Hamm AG, Tirschenreuth (DE)

( * ) Notice: Subject to any disclaimer, the term of this patent is extended or adjusted under 35 U.S.C. 154(b) by 217 days.

(21) Appl. No.: 16/963,957

(22) PCT Filed: Jun. 24, 2019

(86) PCT No.: PCT/EP2019/066644
§ 371 (c)(1),
(2) Date: Jul. 22, 2020

(87) PCT Pub. No.: WO2020/007632
PCT Pub. Date: Jan. 9, 2020

(65) Prior Publication Data
US 2021/0039724 A1    Feb. 11, 2021

(30) Foreign Application Priority Data

Jul. 4, 2018 (DE) .................. 10 2018 116 194.8

(51) Int. Cl.
*B62D 53/02* (2006.01)
*B62D 12/00* (2006.01)
(Continued)

(52) U.S. Cl.
CPC ........... *B62D 53/021* (2013.01); *B62D 12/00* (2013.01); *E02D 3/026* (2013.01); *E02F 9/0841* (2013.01); *E01C 19/231* (2013.01); *E01C 19/26* (2013.01)

(58) Field of Classification Search
CPC ...... B62D 53/021; B62D 12/00; E02D 3/026; E02F 9/0841; E01C 19/282; E01C 19/26; E01C 19/231
See application file for complete search history.

(56) References Cited

U.S. PATENT DOCUMENTS 5,632,350 A * 5/1997 Gauvin .................... B60D 1/00
280/492
5,873,431 A * 2/1999 Butler .................. B62D 53/026
180/418
(Continued)

FOREIGN PATENT DOCUMENTS

DE         25 11 446      9/1976
DE         10158912 A1    6/2003
(Continued)

OTHER PUBLICATIONS

International Preliminary Report on Patentability of PCT/EP2019/066644 dated Jan. 5, 2021, 8 pages.
(Continued)

*Primary Examiner* — Kevin Hurley
*Assistant Examiner* — Marlon A Arce
(74) *Attorney, Agent, or Firm* — Rankin, Hill & Clark LLP (57) ABSTRACT

An articulated/swivel joint for the articulated connection between a rear section and a front section of a construction machine includes a joint mechanism assigned to a swivel-stop arrangement for limiting the swivel movement of a front joint part in relation to a rear joint part. The swivel-stop arrangement includes a first swivel stop for predetermining a maximum amount of swivel deflection during deflection of the front joint part in relation to the rear joint part in a first swivel-movement direction and a second swivel stop for predetermining a second maximum amount of swivel deflection during deflection of the front joint part in relation to the (Continued)

rear joint part in a second swivel-movement direction. When an articulated movement is performed, the maximum swivel-deflection range decreases as the amount of articulated deflection increases, starting from a neutral position of articulation of the front joint part in relation to the rear joint part.

18 Claims, 4 Drawing Sheets

(51) Int. Cl.
    *E02D 3/026*     (2006.01)
    *E02F 9/08*     (2006.01)
    *E01C 19/23*     (2006.01)
    *E01C 19/26*     (2006.01)

(56) References Cited

U.S. PATENT DOCUMENTS

| | | | |
|---|---|---|---|
| 8,764,034 B2* | 7/2014 | Wells | F16C 33/6637 280/93.511 |
| 10,793,189 B2* | 10/2020 | Batz | B62D 7/18 |
| 2003/0127828 A1* | 7/2003 | Seebohm | B62D 53/021 280/492 |
| 2011/0194921 A1* | 8/2011 | Roose | B62D 12/00 414/812 |
| 2012/0211973 A1* | 8/2012 | Werner | B62D 53/025 280/781 |
| 2015/0210316 A1 | 7/2015 | Haubrich et al. | |

FOREIGN PATENT DOCUMENTS

| | | |
|---|---|---|
| DE | 102010014811 A1 | 11/2010 |
| DE | 10 2015 112 957 | 11/2016 |
| EP | 01111134 | 6/2001 |
| EP | 1156406 | 11/2001 |
| EP | 2872379 A1 | 5/2015 |
| JP | 61-024674 | 2/1986 |

OTHER PUBLICATIONS

German Search Report of German Application No. 10 2018 116 194.8 dated Mar. 27, 2019, 10 pages.
International Search Report and Written Opinion of PCT/EP2019/066644 dated Sep. 2, 2019, 17 pages (English and German).

\* cited by examiner

ARTICULATED/SWIVEL JOINT FOR THE ARTICULATED CONNECTION BETWEEN A REAR SECTION AND A FRONT SECTION OF A CONSTRUCTION MACHINE

The present invention relates to an articulated/swivel joint for the articulated connection of a rear section and a front section of a construction machine, in particular a soil compactor, comprising a rear joint part, which is to be fitted on a rear section of a construction machine, a front joint part, which is to be fitted on a front section of a construction machine, and a joint mechanism, which couples the rear joint part to the front joint part in a jointed manner, wherein the joint mechanism couples the rear joint part and the front joint part in order to perform an articulated movement, which corresponds to a steering movement between the rear section and front section, and a swivel movement, which corresponds to a torsion movement between the rear section and front section, wherein the joint mechanism is assigned to a swivel-stop arrangement for limiting the swivel movement of the front joint part in relation to the rear joint part, wherein the swivel-stop arrangement comprises a first swivel stop for predetermining a first maximum amount of swivel deflection during deflection of the front joint part in relation to the rear joint part in a first swivel-movement direction and also comprises a second swivel stop for predetermining a second maximum amount of swivel deflection during deflection of the front joint part in relation to the rear joint part in a second swivel-movement direction, which is counter to the first swivel-movement direction, wherein the first maximum amount of swivel deflection and the second maximum amount of swivel deflection define a maximum swivel-deflection range for the swivel movement of the front joint part in relation to the rear joint part.

An articulated/swivel joint for the articulated connection of the rear section of a construction machine designed as a soil compactor with a front section having a compactor roller is known from EP 1 111 134 A2. This articulated/swivel joint has a substantially plate-like rear joint part to be fitted to the rear section of the soil compactor and a likewise substantially plate-like front joint part to be fitted to the front section of the soil compactor. The two joint parts lie opposite one another at a distance in a distance direction and are connected to one another in an articulated manner orthogonal to this distance direction, i.e. substantially in a height direction of the soil compactor, in the upper region thereof by a coupling part. The coupling part is connected in an articulated manner in the region of a first joint unit designed as a ball joint to the rear joint part and is connected to the front joint part in the region of a second joint unit likewise designed as a ball joint and thus extends substantially in the horizontal direction approximately in a longitudinal direction of the soil compactor. Orthogonal to the distance direction, i.e. in a height direction below the coupling part, a rear joint support is provided on the rear joint part, which extends towards the front joint part. Correspondingly, a front joint support to be extended to the rear joint part is provided on the front joint part. These two joint supports are connected to one another in an articulated manner via a third joint unit designed as a ball joint.

With this type of articulated/swivel joint, such a connection between rear section and front section is created in a kinematically advantageous manner, in that the two joint parts can perform an articulation movement in relation to one another in order to steer the soil compactor, wherein this articulation movement approximately corresponds to a pivoting between the front section and the rear section or the front joint part and the rear joint part about a steering axis which is not fixed when an articulation movement is carried out in space or in relation to the rear section, but which runs basically approximately vertical. In order to be able to compensate for unevenness in the ground and thus to avoid the fact that the compactor roller provided on the front section rests with different loads on the ground to be compacted transversely to the longitudinal direction of the soil compactor, this known articulated/swivel joint also enables a swivel movement between front section and rear section, which approximately corresponds to a pivoting in relation to the rear section about a longitudinal axis running in the longitudinal direction of the soil compactor, which is also not fixed in space or in relation to the rear section when the swivel movement is performed. This swivel movement leads to a torsion of the soil compactor, so that the front section and rear section can adapt to the geometry of the ground substantially independently of each other.

An articulation/swivel joint with a different structural design and, accordingly, also different kinematics is known from EP 2 872 379 B1. In this known articulated/swivel joint, a rear joint part provided on the rear section of a soil compactor and a front joint part provided on the front section of the soil compactor can be pivoted about an articulation axis which is inclined in relation to a vertical direction and fixed in relation to the rear section. The front joint part comprises a first joint part portion which is pivotally connected to the rear joint part about the articulation axis and a second joint part portion which is fixed to the front section and which can be pivoted in relation to the first joint part portion by a substantially horizontal swivel axis which is therefore disposed at an angle different from 90° in relation to the articulation axis. On the first joint part portion pivotably coupled to the rear joint part about the articulation axis, two swivel stops are provided which cooperate with two counter-stops provided on the second joint part portion of the front joint part to provide respective swivel stops. If the two joint part portions of the front joint part are in a neutral position of swivel in relation to each other, in which the front section and the rear section of the soil compactor are not twisted in relation to each other, the mutually assigned stops and counter-stops are disposed at the same distance from each other, so that starting from the neutral position of swivel, the two joint part portions of the front joint part can pivot to the same extent in relation to each other in each direction of swivel movement until a respective stop comes into contact with the assigned counter-stop when a respective maximum swivel deflection is reached and a further swivel movement is not permitted.

Due to the inclination of the articulation axis in relation to the vertical direction, even in the case of perfectly flat ground, which generally does not require a swivel movement between the front section and the rear section, the articulation of the front section in relation to the rear section, i.e. the performance of a steering movement, starting from a neutral position of articulation, which corresponds to a straight travel of the soil compactor, leads to the articulation movement between the front and rear joint part forcibly pivoting between the first joint part portion and the second joint part portion of the front joint part, to ensure that the compactor roller stands up evenly on the ground over its entire width. One pair of stop and counter-stop approaches each other, while the other pair of stop and counter-stop moves away from each other. Since, as a result of this rotation between the first joint part portion and the second joint part portion of the front joint part, which is forcibly caused when an articulation movement or steering movement is performed, a part of the swivel path available in this swivel movement direction until the maximum swivel deflection has been reached is used, there is only a reduced residual swivel deflection is available for a further swivel movement in this swivel movement direction, for example caused by the ground, while a residual swivel deflection that is increased to the same extent is available for a swivel movement in the opposite swivel movement direction. However, the swivel deflection range provided between the two maximum swivel deflections and defined by them remains unchanged.

It is the object of the present invention to provide an articulated/swivel joint for the articulated connection of a rear section with a front section of a construction machine, in particular a soil compactor, with which an increased security against an excessive swivel movement of the two joint parts in relation to one another is achieved.

This object is achieved according to the invention by an articulated/swivel joint for the articulated connection of a rear section and a front section of a construction machine, in particular a soil compactor, comprising a rear joint part, which is to be fitted on a rear section of a construction machine, a front joint part, which is to be fitted on a front section of a construction machine, and a joint mechanism, which couples the rear joint part to the front joint part in an articulated manner, wherein the joint mechanism couples the rear joint part and the front joint part in order to perform an articulated movement, which corresponds to a steering movement between the rear section and front section, and a swivel movement, which corresponds to a torsion movement between the rear section and front section, wherein the joint mechanism is assigned to a swivel-stop arrangement for limiting the swivel movement of the front joint part in relation to the rear joint part, wherein the swivel-stop arrangement comprises a first swivel stop for predetermining a first maximum amount of swivel deflection during deflection of the front joint part in relation to the rear joint part in a first swivel-movement direction and also comprises a second swivel stop for predetermining a second maximum amount of swivel deflection during deflection of the front joint part in relation to the rear joint part in a second swivel-movement direction, which is counter to the first swivel-movement direction, wherein the first maximum amount of swivel deflection and the second maximum amount of swivel deflection define a maximum swivel-deflection range for the swivel movement of the front joint part in relation to the rear joint part.

It is further provided that when an articulated movement is performed with increasing articulation deflection, the maximum swivel-deflection range decreases, starting from a neutral position of articulation of the front joint part in relation to the rear joint part.

In a departure from the structure of an articulated/swivel joint known from EP 2 872 379 B1, in the structure according to the invention, when an articulated movement is performed, for example a steering movement of a construction machine, it does not decrease or not only the residual swivel deflection until a maximum pendulum deflection still available until a maximum swivel deflection is reached due to a swivel movement which is forcibly induced by an articulation movement, but the maximum swivel-deflection range, i.e. the swivel path between the two maximum swivel deflections, decreases. This increases the certainty that system regions coupled to the two joint parts, for example a rear section and a front section of a construction machine, do not come into contact with one another when an articulation movement or steering movement is performed and, in addition, the swivel movement also occurs, and damage may thereby be caused.

In a configuration which is particularly advantageous for a uniform movement sequence, it is proposed that when the articulation movement is performed with increasing articulation deflection, the maximum swivel-deflection range continuously decreases starting from the neutral position of articulation. This means that, starting from the neutral position of articulation, i.e. a position of the two joint parts in relation to each other, which they assume, for example, when a construction machine equipped with an articulated/swivel joint according to the invention moves straight ahead, there is no region of the articulation movement in which the maximum swivel-deflection range does not decrease when moving in the direction of increasing articulation deflection.

Since in the case of the positioning of the neutral position of articulation, for example when the construction machine is moving straight ahead, the risk of an excessively strong swivel movement which may lead to damage is comparatively low, it is proposed that in the case of the front joint part and the rear joint part positioned in the neutral position of articulation in relation to each other, the first maximum amount of swivel deflection and/or the second maximum amount of swivel deflection starting from a neutral position of swivel lies in the range from 8° to 15°, preferably around 11.7°, and/or in that in the case of the front joint part and the rear joint part positioned in the neutral position of articulation in relation to one another, the maximum swivel-deflection range lies in the range from 20° to 27°, preferably around 23.4°.

If there is a comparatively large articulated deflection, which corresponds to a comparatively large steering angle of a construction machine, then, according to the invention, in order to avoid an excessively strong swivel deflection, it is proposed in the case of an articulated deflection of the front joint part in relation to the rear joint part corresponding to a steering angle of 30°, the first maximum amount of swivel deflection and/or the second maximum amount of swivel deflection, starting from a neutral position of swivel of the front joint part in relation to the rear joint part, lies in the range from 4° to 11°, preferably at around 7.6°, and/or in that in the case of the front joint part and the rear joint part positioned at an articulated deflection of the front joint part in relation to the rear joint part corresponding to a steering angle of 30°, the maximum swivel-deflection range lies in a range from 12° to 19°, preferably at around 15.2°.

In a construction which is particularly advantageous for the steering or swivel kinematics, the joint mechanism can comprise:
  a coupling part articulated in the region of a first joint unit with the rear joint part and in the region of a second joint unit with the front joint part,
  a rear joint support to be extended from the rear joint part to the front joint part, a front joint support to be extended from the front joint part to the rear joint part and a third joint unit coupling in a distance direction of the front joint part in relation to the rear joint part the rear joint support between the first joint unit and the second joint unit and orthogonal to the distance direction at a distance from the first joint unit and the second joint unit articulated to the front joint support.

In the structure of the articulated/swivel joint with the three joint units specified above, such kinematics are generated in particular in the case of superimposed articulated movement and swivel movement so that in none of the joint units does a pivoting occur exclusively about a pivot axis which is fixed in space or, for example, in relation to the rear section. To take this into account, it is proposed that the first joint unit and/or the second joint unit and/or the third joint unit is designed in the manner of a ball joint. This means that each joint unit designed in this way is capable of permitting a pivoting movement of the two components or assemblies coupled thereby by more than one spatial axis. For example, such a joint unit can be designed as a ball joint with a joint ball and a joint socket receiving it. Such functionality in the manner of a ball joint can also be provided, for example, by a cardan joint.

In order to be able to provide the functionality according to the invention for limiting the swivel movement with decreasing maximum swivel-deflection range in a structurally simple but nevertheless reliably acting manner, it is proposed that the swivel-stop formation comprises:

- on a joint part of the front joint part and the rear joint part a first swivel-stop formation to be extended to the other joint part of the front joint part and the rear joint part with two swivel-stop surfaces oriented away from each other,
- on the other joint part a second swivel-stop formation to be extended to the one joint part and encompassing the first swivel-stop formation with two swivel-stop fingers in a fork-like manner, wherein each swivel-stop finger lies opposite one of the swivel-stop surfaces and provides a swivel stop therewith.

The interaction between the two swivel-stop formations, which changes or adapts corresponding to the changing articulation deflection, can be provided in that the first swivel-stop formation has a web region extending in the direction away from one joint part and, at an end region of the web region remote from a joint part, has a head region which is enlarged in relation to the web region, wherein the distance between the swivel-stop surfaces oriented facing away from each other is at least partially greater in the head region than in the web region, wherein preferably at least in a part of the web region the distance between the swivel-stop surfaces oriented away from each other is substantially constant or changes in a web region longitudinal direction at a substantially constant rate.

In the head region, the distance between the swivel-stop surfaces oriented facing away from each other then preferably increases, starting from the web region up to a maximum distance. These swivel-stop surfaces oriented facing away from each other thus each form cam surfaces which cooperate with the cams of the second swivel-stop formation which scan these surfaces.

It is further proposed that, in order to provide the maximum swivel movement range that changes depending on the deflection of the articulation, the mutual distance of the swivel-stop fingers in the direction away from the other joint part increases in a first extension region of the swivel-stop fingers and decreases in a second extension region of the swivel-stop fingers adjoining the first extension region.

In a particularly advantageous embodiment, the swivel-stop surfaces cooperate with their respectively assigned swivel-stop fingers in such a way that, starting from the neutral position of articulation with increasing articulation deflection of the front joint part in relation to the rear joint part, each swivel-stop finger of the second swivel-stop formation in a region of the assigned swivel-stop surface closer to one joint part cooperates with this swivel-stop surface of the first swivel-stop formation to provide a respective swivel stop, and/or in that starting from the neutral position of articulation with increasing articulation deflection of the front joint part in relation to the rear joint part, each swivel-stop finger of the second swivel-stop formation cooperates with a region of the respective swivel-stop finger closer to the other joint part with the assigned swivel-stop surface of the first swivel-stop formation to provide a respective swivel stop.

In particular, it can be provided that in the neutral position of articulation, each swivel-stop finger of the second swivel-stop formation cooperates in the region of its first extension region with the assigned swivel-stop surface in the region of the head region of the first swivel-stop formation to provide a respective swivel stop, and/or that in an articulation deflection of the front joint part in relation to the rear joint part corresponding to a steering angle of 30°, each swivel-stop finger of the second swivel-stop formation cooperates in the region of its second extension region with the assigned swivel-stop surface in the region of the web region of the first swivel-stop formation to provide a respective swivel stop.

In the structure of an articulated/swivel joint according to the invention, one joint part can be the front joint part and the other joint part the rear joint part.

For a reliable cooperation of the two swivel-stop formations when the articulated/swivel joint is designed with the three joint units explained above, it is proposed that one joint part is the front joint part and the other joint part is the rear joint part.

The present invention further relates to a construction machine, in particular a soil compactor, comprising a rear section and a front section connected to the rear section by means of an articulated/swivel joint constructed according to the invention.

In this case, an operators stand can be provided on the rear section, which can be positioned for a compact construction in the longitudinal direction in such a way that it overlaps the articulated/swivel joint at least in regions in a longitudinal direction of the construction machine, and is thus positioned, for example, substantially above this joint.

At the front of the construction machine at least one implement, such as a compactor roller, for example, may be provided. A drive assembly provided on the rear section, for example a diesel internal combustion engine, can be provided for propulsion. It should be pointed out that the principles of the present invention can also be used in construction machines other than soil compactors, for example wheel loaders or the like.

The present invention is described in detail below with reference to the accompanying figures. In which.

Figure 1:
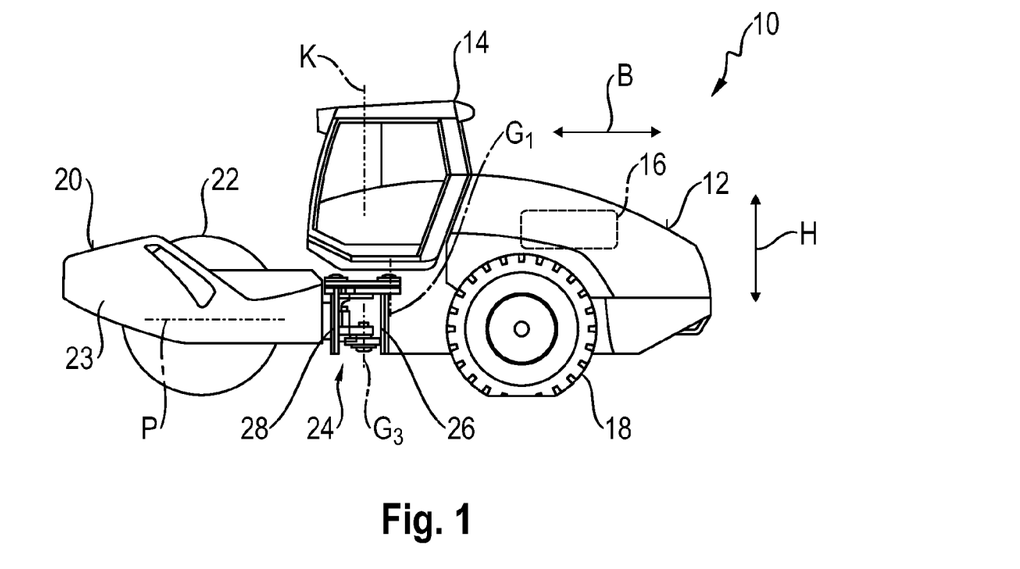
FIG. 1 shows a side view of a construction machine designed as a soil compactor.

In FIG. 1, a construction machine designed as a soil compactor is generally designated with 10. The soil compactor or construction machine 10 comprises a rear section 12, on which an operators stand 14 and a drive assembly 16 are provided. By the drive assembly 16, a diesel internal combustion engine, for example, drive wheels 18 provided on both sides of the rear section 12 can be driven to rotate and the construction machine 10 can thus be moved forward substantially in a longitudinal direction B of the construction machine.

The construction machine 10 further comprises a front section 20 with a frame 23 surrounding a compactor roller 22 provided on the front section 20. The compactor roller 22 can be assigned an oscillation mechanism disposed therein, which applies a periodic oscillation torque in the circumferential direction about an axis of rotation of the compactor roller in order to superimpose an alternating oscillation movement caused by the oscillation torque on the rolling movement of the compactor roller 22. Alternatively or additionally, the compactor roller 22 can be assigned a vibration arrangement, by means of which it is periodically accelerated in a height direction H of the construction machine 10 in order to superimpose a periodic up-down acceleration which is substantially superimposed in the height direction H on the rolling movement of the compactor roller 22.

The rear section 12 is connected to the front section 20 by means of an articulated/swivel joint 24 described in detail below. The articulated/swivel joint 24 allows the front section 20 to be bent in relation to the rear section 12 approximately about an articulation axis K running substantially in the height direction H, in order to thereby steer the construction machine 10. Furthermore, the articulated/swivel joint 24 allows a movement of the front section 20 in relation to the rear section 12 about a swivel axis P which runs approximately in the longitudinal direction B of the construction machine and thus is approximately horizontally oriented. It should already be pointed out here that due to the special design of the articulated/swivel joint 24, the articulation axis K and the swivel axis P only approximately illustrate the axes about which on the one hand for steering and on the other hand for permitting torsion between the front section 20 and rear section 12 movements take place. In fact, this position of the axes K and P only applies to the state in which the rear section 12 and front section 20 are in a neutral position of articulation in relation to each other, that is, the construction machine 10 is to drive straight ahead and without steering lock, and the rear section 12 and front section 20 with the driven wheels 18, on the one hand, or the compactor roller 22, on the other hand, are on perfectly flat ground and thus the rear section 12 and front section 20 are also in a neutral position of swivel in relation to each other, in which a twist, i.e. torsion, between rear section 12 and front section 20 is not present. As soon as a deflection from the neutral position of articulation or the neutral position of swivel occurs, the respective axis will shift in space and in particular also in relation to the rear section 12 and the front section 20.

Figure 2:
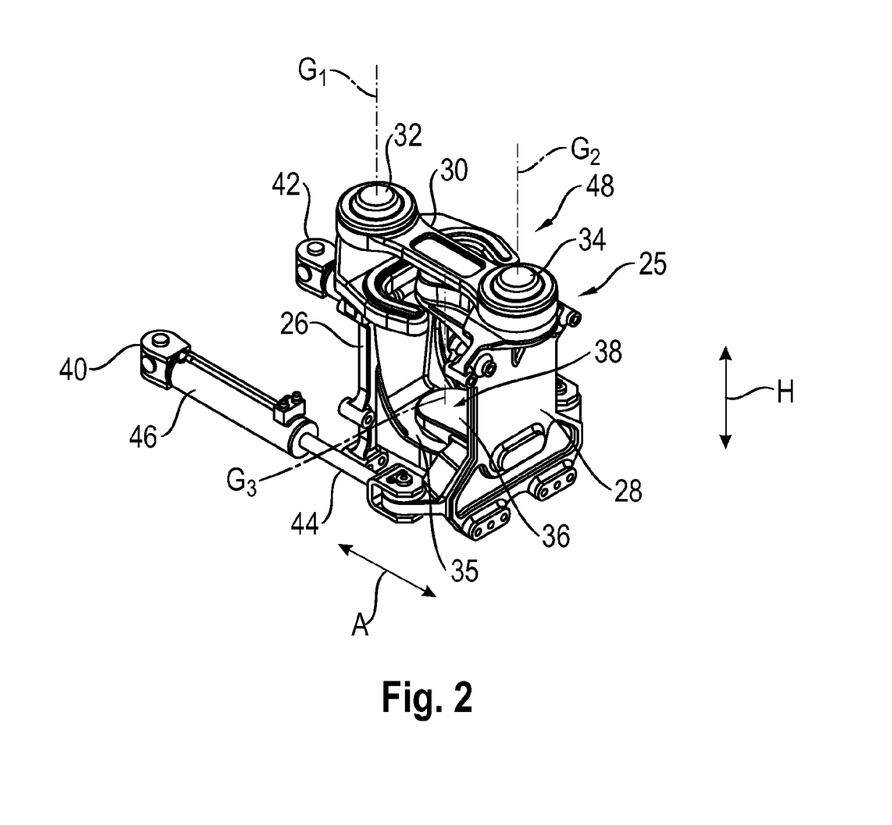
FIG. 2 shows a perspective view of an articulated/swivel joint of the construction machine of FIG. 1.

FIG. 2 shows the articulated/swivel joint 24 in a perspective view. The articulated/swivel joint 24 comprises a plate-like rear joint part 26, with which the articulated/swivel joint 24 is fixed to a front region of the rear section 12, which is below the operators stand 14, for example by screwing. The articulated/swivel joint 24 further comprises, for example, a plate-shaped front joint part 28 which is opposite the rear joint part 26 in a distance direction A. In the case of rear section 12 and front section 20 disposed in the neutral position of articulation and the neutral position of swivel, this distance direction A corresponds, for example, to the longitudinal direction B of the construction machine.

In an upper region in the height direction H, which is oriented orthogonally to the distance direction A, the rear plate part 26 and the front plate part 28 are connected to each other in an articulated manner by a bar-like or rod-like coupling part 30 of a joint mechanism, generally designated with 25. For this purpose, the coupling part 30 is coupled in the region of a first joint unit 32 to the rear joint part 26 and is coupled in the region of a second joint unit 34 to the front joint part 28. Each of the two joint units 32, 34 enables the coupling part 30 to be pivoted with respect to the rear joint part 26 or the front joint part 28 about a respective joint axis G1 or G2, which in the neutral position of articulation and the neutral position of swivel are oriented substantially in the vertical direction. However, the joint units 32, 34 also allow the coupling part 30 to be pivoted in relation to the respective joint parts 26, 28 about further joint axes, so that the coupling part 30 can be pivoted in any direction in relation to the respective joint part 26 or 28, at least to a limited extent, in the manner of a ball joint. For example, the joint units 32, 34 can be designed as a ball joint with a joint ball provided on the respective joint part 26 or 28 and a joint socket provided on the coupling part 30.

Provided on the rear joint part 26 is a rear joint support 35 to be extended in the distance direction A to the front joint part 28. Correspondingly, a front joint support 36, to be extended in the direction of distance A above the rear joint support 35 onto the rear joint part 26, is provided on the front joint part 28. By means of a third joint unit 38, the two joint supports 35, 36 and thus the two joint parts 26, 28 can be pivoted in relation to each other about a third joint axis G3, which in turn, in the case of the joint part 26, 28 positioned in the neutral position of articulation and the neutral position of swivel, can be oriented substantially in the height direction H. However, the third joint unit 38 also allows the two joint supports 35, 36 to be pivoted in relation to each other in substantially any direction in space and is preferably designed equally as a ball joint.

In order to be able to cause an articulation movement of the articulated/swivel joint 24 and thus a steering movement of the construction machine 10, two piston/cylinder units 40, 42 are assigned to the articulated/swivel joint 24. As illustrated with the aid of the piston/cylinder unit 40, a piston rod 44 can, for example, be coupled to the front joint part 28, while a cylinder 46 can be coupled to the rear section 12. By coordinated extending or retracting of the piston rods 44 of the two piston/cylinder units 40, 42, an articulation movement of the articulated/swivel joint 24 can be triggered, in the course of which the front joint part 28 in the region of the third joint unit 38 is pivoted in relation to the rear joint part 26, wherein this pivoting movement is guided in the upper region of the two joint parts 26, 28 in the height direction H through the coupling part 30, which pivots in relation to each joint part 26, 28 in the course of this articulation movement. In the course of this movement, not only does the front section 20 bend in relation to the rear section 12 so as to set a steering angle in each case, but there is also an articulation movement between the front section 20 and rear section 12 in the region of the articulated/swivel joint 24 in the vertical direction, within the meaning that in this central region the construction machine 10 is raised to an extent corresponding to the steering angle provided in each case. Since this is a state of increased potential energy, the construction machine 10 thus always independently attempts to assume the state in which the two joint parts 26, 28 are positioned in relation to each other in a neutral position of articulation corresponding to the straight travel of the construction machine 10.

If the soil compactor 10 moves on uneven ground, the articulated connection of the two piston/cylinder units 40, 42 both to the front joint part 28 as well as to the rear section 12 means that the front joint part 28 can in turn substantially pivot in the region of the third joint unit 38 in relation to the rear joint part 26, wherein this pivoting approximately corresponds to a pivoting about the swivel axis P and the movement of the front joint part 28 occurring in the upper region of the same is in turn guided through the coupling part 30. With such a swivel movement, the construction machine 10 twists itself, so that the driven wheels 18 on the one hand and the compactor roller 22 on the other hand can stand up evenly loaded on correspondingly uneven ground.

In the course of such a movement, the frame 23 of the front section 20 approaches the operator's stand 14 which also overlaps it in regions in the longitudinal direction B of the construction machine. In order to rule out that, particularly when a steering movement is performed, the frame 23, which is moved even more under the operator's stand 14, comes into contact with the operator's stand 14 or other regions of the rear section 12, a swivel-stop arrangement generally designated with 48 is provided in the articulated/swivel joint 24. The functionality thereof is also explained below with reference to FIGS. 3 to 8, which illustrate different relative positions of the two joint parts 26, 28 in relation to each other. It should be noted that FIGS. 3 to 8 each show the articulated/swivel joint in a view from above and with the coupling part 30 removed.

The swivel-stop arrangement 48 comprises, on the front joint part 28, a first swivel-stop formation 50 to be extended from the front joint part 28 to the rear joint part 26. This first swivel-stop formation 50 is bar-like or plate-like and has two swivel-stop surfaces 52, 54 oriented laterally away from each other in relation to the height direction H. The first swivel-stop formation 50 is designed with a web region 56 starting from a region in which the second joint unit 34 is also provided, wherein the two swivel-stop surfaces 52, 54 are at an approximately uniform distance from each other in this web region 56, which ultimately means that the web region 56 has an approximately constant width transverse to its longitudinal extension direction in the direction away from the second joint unit 34. It can be seen in the figures that the swivel-stop surfaces 52, 54 can be disposed so as to diverge in the direction from top to bottom in the height direction H, that is to say substantially orthogonally to a web region longitudinal direction. It should also be emphasised that, within the meaning of the present invention, the web region 56 can be considered to have a constant or approximately constant width if, for example, based on a length of the web region 56 in the web region longitudinal direction, i.e. in a direction away from the joint unit 34, from about 45 mm to 65 mm, preferably about 55 mm, the mutual distance of the swivel-stop surfaces 52, 54 does not vary by more than 5 mm, i.e. about 10%. This means that, assuming a uniform increase in the mutual distance, the two swivel-stop surfaces 52, 54, which are regarded as having approximately constant mutual distance, can include an opening angle of up to approximately 3° to each other, but can also be aligned, for example, with an exactly constant distance from each other. In principle, the two swivel-stop surfaces 52, 54 could also, in contrast to the meaning of the preceding illustration, have a mutual distance that increases, for example, in the direction away from the joint unit 34, preferably at a substantially constant rate, so that in this web region 56 or at least part of the web region 56, the two swivel-stop surfaces 52, 54 run approximately non-curved, wherein the web region 56 or this part of the web region 56 in turn has a length in the range from about 45 mm to 65 mm, preferably about 55 mm.

This web region 56 is adjoined by a head region 58 which is widened in relation to the web region 56 and with which the first swivel-stop formation ends at a distance from the front joint part 28 and also from the second joint unit 34. In the transition from the web region 56 to the head region 58, the mutual distance of the swivel-stop surfaces 52, 54 gradually increases up to a region of maximum width of the head region and thus maximum distance of the swivel-stop surfaces 52, 54, which merge into each other at the end of the head region 58 facing away from the web region 56 or connect to each other. In order to ensure sufficient stability of the first swivel-stop formation, the web region 56 or the head region 58 are backed or preferably integrally formed by a plate-like support region 60, so that between the head region 58 and a connection region 62 in which the first swivel-stop formation 50 is connected to the second joint part 28, engagement pockets 64, 66 are formed on both sides of the web region 56 and above the plate-like support region 60.

The swivel-stop arrangement 48 further comprises a second swivel-stop formation 68 on the rear joint part 26. This is also substantially plate-shaped and, starting from a connection region 70, in which the second swivel-stop formation 68 is connected to the first joint part 26, has two swivel-stop fingers 72, 74 encompassing the first swivel-stop formation 50 laterally or on both sides from outside in relation to the height direction H. A receiving space 76 is formed between the swivel-stop fingers 72, 74, in which the first swivel-stop formation 50 with its web region 56 or its head region 58 is positioned in an engaging manner.

The swivel-stop fingers 72, 74 are shaped such that their mutual distance increases in a respective first extension region 78, 80 and decreases in a second extension region 82, 84 adjoining it. This also means that, starting from the connection region 70, the width of the space region 76 defined by the mutual distance of the swivel-stop fingers 72, 74 initially increases in the region of the first extension regions 78, 80 and then decreases in the region of the second extension regions 82, 84, to then in turn increase in the region of rounded ends of the two swivel-stop fingers 72, 74.

The swivel-stop arrangement 48 or the two swivel-stop formations 50, 68 thereof ensure that the front joint part 28 can only perform a swivel movement in relation to the rear joint part 26 to a limited extent. This limited extent, i.e. the maximum amount of swivel deflection in each direction of pendulum movement, also preferably decreases steadily as the deflection of the articulation, i.e. the steering angle of the front section 20 in relation to the rear section 12, increases. This is explained below with reference to FIGS. 3 to 8.

Figure 3:
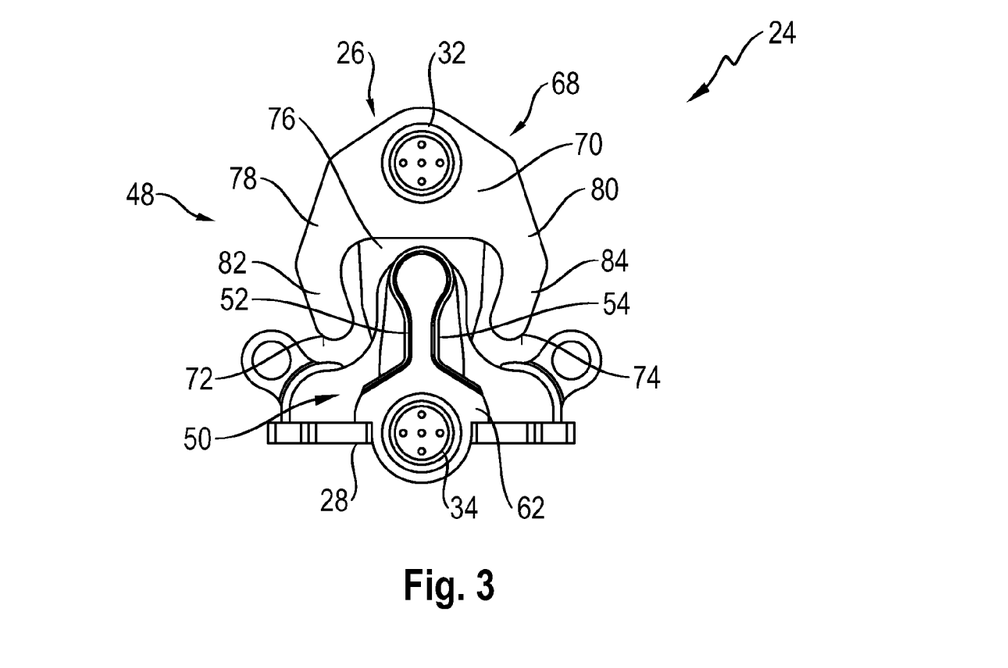
FIG. 3 shows a plan view of the articulated/swivel joint of FIG. 2 in a neutral position of a front joint part and a rear joint part in relation to each other.

FIG. 3 shows a state in which the two joint parts 26, 28 and thus rear section 12 and front section 20 are in a neutral position of articulation and also a neutral position of swivel in relation to each other, which means that the construction machine 10 should move straight ahead on perfectly flat ground. It can be seen in FIG. 3 that the first swivel-stop formation 50 engages substantially centrally in the receiving space 76 and thus the two swivel-stop surfaces 52, 54 are at the same distance from the swivel-stop fingers 72, 74 which are opposite each of them and thus each provide a swivel stop 86 or 88.

Figure 4:
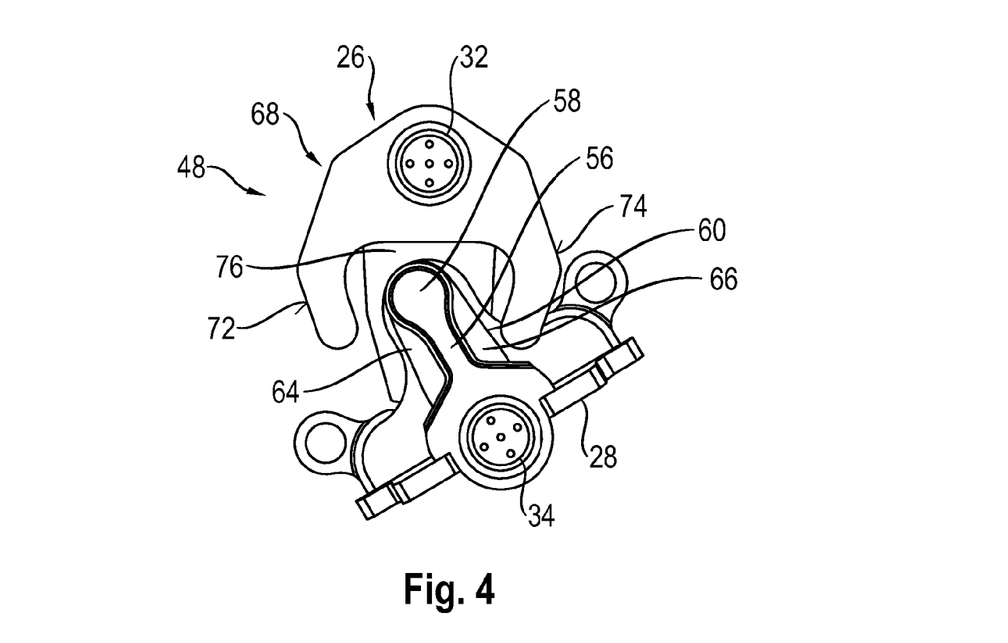
FIG. 4 shows a view corresponding to FIG. 3 with a positioning of the front and rear joint part in relation to each other corresponding to a steering angle of 30° and a swivel angle of 0°.

FIG. 4 shows a state in which the front joint part 28 is bent in relation to the rear joint part 26 in order to bring about a steering angle of 30°. In this state there is no swivel deflection, so that the head region 58 is still positioned approximately centrally between the two swivel-stop fingers 72, 74. The swivel stops 86, 88 are not effective due to the lack of swivel deflection.

Figure 5:
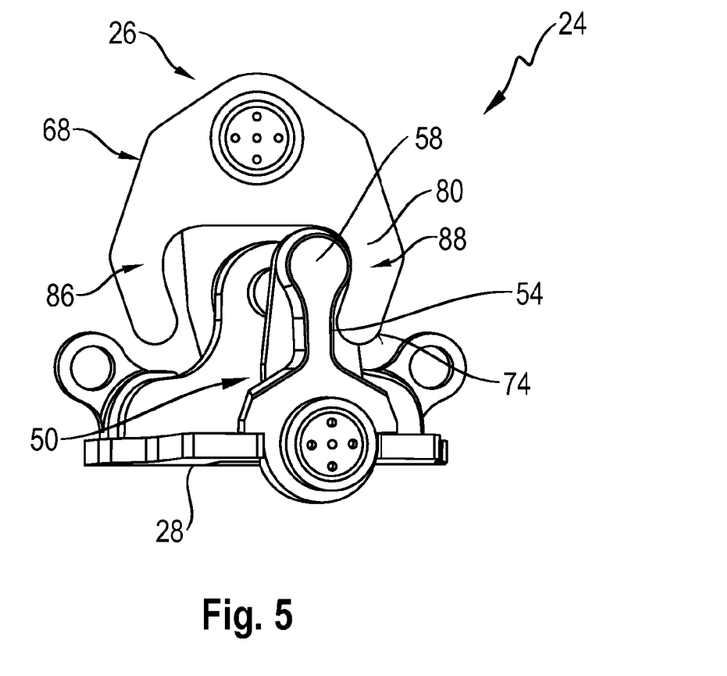
FIG. 5 shows a view corresponding to FIG. 3 with a positioning of the front and rear joint part in relation to each other corresponding to a steering angle of 0° and a swivel angle of 11.7°.

FIG. 5 shows the articulated/swivel joint 24 in a state in which, in the neutral position of articulation, i.e. at a steering angle of 0°, the front joint part 28 has a first maximum amount of swivel deflection in relation to the rear joint part 26. The first maximum amount of swivel deflection corresponds to the maximum amount of swivel deflection in a first swivel movement direction, in which the first swivel-stop formation 50 with its swivel-stop surface 54 is in contact with the swivel-stop finger 74 and thus the swivel stop 88 is effective. Correspondingly, when deflecting in the opposite direction, i.e. a second swivel movement direction, the swivel-stop surface 52 comes into contact with the swivel-stop finger 72 when a second maximum amount of swivel deflection is reached and the swivel stop 86 is thus effective.

It can be seen in FIG. 5 that in this state, in which the steering angle is 0°, the two joint parts 26, 28 are therefore in their neutral position of articulation in relation to each other, the first swivel-stop formation 50 engages in the receiving space 76 to an almost maximum extent and thus when the first maximum amount of swivel deflection is reached, the head region 58 with a portion of the swivel-stop surface 54 extending there is in contact with the first extension region 80 of the swivel-stop finger 74.

Figure 6:
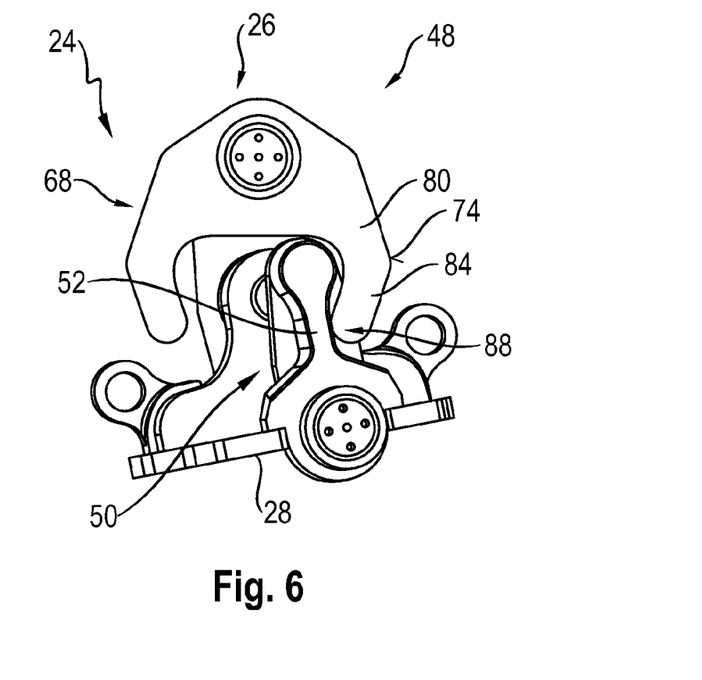
FIG. 6 shows a view corresponding to FIG. 3 with a positioning of the front and rear joint part in relation to each other corresponding to a steering angle of 10° and a swivel angle of 10.8°.

FIG. 6 illustrates the state in which, again with a maximum amount of first swivel deflection, there is an articulated deflection of the two joint parts 26 and 28 in relation to each other which leads to a steering angle of 10°. It can be seen that in this state the head region 58 with the region of the swivel-stop surface 54 provided thereon is no longer in contact with the swivel-stop finger 74, but rather with its second extension portion 84, in particular the rounded end region thereof, is in contact with a portion of the swivel-stop surface 54 extending into the web region 56. Thus, on the one hand, the region of interaction between the swivel-stop finger 74 and the first swivel-stop formation 50 has shifted from the first extension region 80 to the second extension region 84 of the swivel-stop finger 74, and on the other hand, on the first swivel-stop formation 50, the region in which the swivel stop 88 is effective, in relation to the state with less articulation deflection or no articulation deflection (for example, steering angle 0°) is moving closer to the second joint part 28 or the connection region 62 of the first swivel-stop formation 50. Due to the geometry of the swivel-stop surface 54 and the assigned swivel-stop finger 74 interacting with each other, the first maximum amount of swivel deflection in relation to the state shown in FIG. 5 is thereby reduced. While, for example, in the state of FIG. 5, the first maximum amount of swivel deflection can correspond to a swivel angle of, for example, 11.7° starting from the neutral position of swivel of FIG. 3, in the state shown in FIG. 6, with a steering angle of 10°, the first maximum amount of swivel deflection can already be reduced to a value of approximately 10.8°. Due to the symmetrical design, as already explained above, a second maximum amount of swivel deflection is also provided when deflecting in the opposite direction, wherein the first maximum amount of swivel deflection and the second maximum amount of swivel deflection together define a maximum swivel deflection range for a predetermined articulation deflection, which, in turn taking into account the symmetrical design, can in each case correspond to twice the first maximum amount of swivel deflection or the second maximum amount of swivel deflection. In the state shown in FIG. 5, there is therefore a maximum swivel deflection range which can be, for example, approximately 23.4°. With a steering angle of 10° or a corresponding articulation of the two joint parts 26, 28 in relation to each other, this maximum swivel deflection range has already decreased to a value of, for example, approximately 21.6°.

Figure 7:
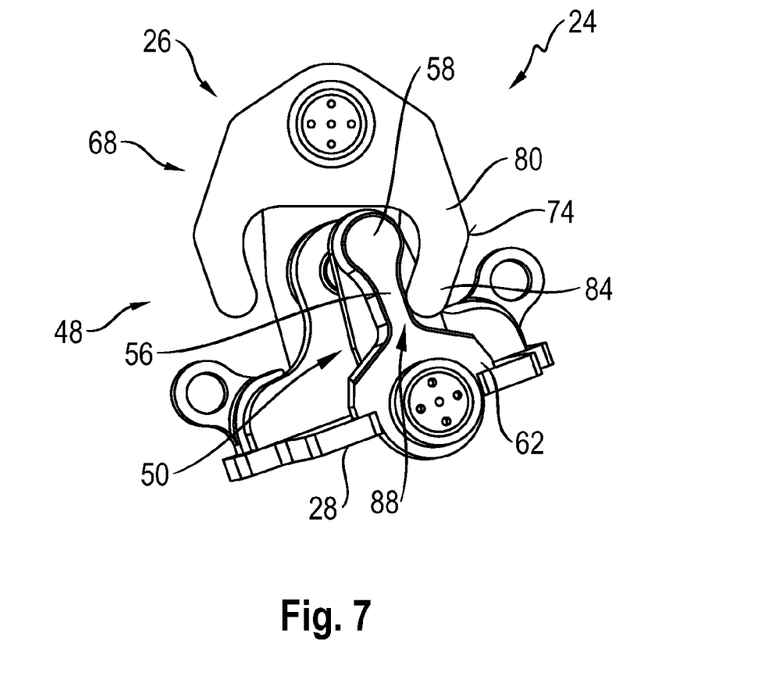
FIG. 7 shows a view corresponding to FIG. 3 with a positioning of the front and rear joint part in relation to each other corresponding to a steering angle of 20° and a swivel angle of 9.3°.

In the case of a transition, illustrated in FIG. 7, to a state of the articulation deflection between the rear joint part 26 and the front joint part 28, which corresponds to a steering angle of 20°, the region in which a respective swivel-stop finger 72, 74, in the deflection state shown in FIG. 7 in turn the swivel-stop finger 74, interacts with the assigned swivel-stop surface 52 or 54 shifts even closer to the front joint part 28 or the connection region 62 of the first swivel-stop formation 50. This leads to a further reduction in the first maximum amount of swivel deflection or, due to the symmetrical design, also the second maximum amount of swivel deflection to, for example, 9.3° in each case and thus a maximum swivel deflection range of 18.6°.

Figure 8:
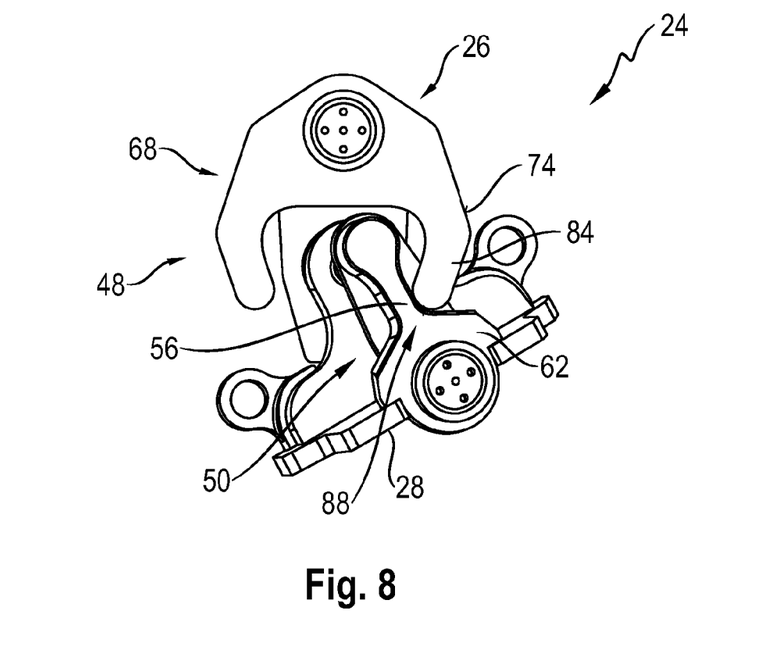
FIG. 8 shows a view corresponding to FIG. 3 with a positioning of the front and rear joint part in relation to each other corresponding to a steering angle of 30° and a swivel angle of 7.6°.

FIG. 8 finally illustrates a state in which the articulation deflection between the front joint part 28 and the rear joint part 26 corresponds to a steering angle of 30°. In this state, in order to limit the swivel movement, a respective swivel-stop finger 72 or 74 comes into contact with the assigned swivel-stop surface, here the swivel-stop surface 54, in a region which is even closer to the connection region 62 or to the front joint part 28. Due to this interaction, the swivel stop 88 is now effective at a first maximum amount of swivel deflection or a second maximum amount of swivel deflection of approximately 7.6°, so that a maximum swivel deflection range of approximately 15.2° results for a steering angle of 30°.

The above explanations show that in the embodiment of an articulated/swivel joint shown in FIG. 2, due to the special configuration of the two swivel-stop formations 50, 68 of the swivel-stop arrangement 48 when performing a steering movement and the two joint parts 26, 28 are caused to bend in relation to each other, the overall swivel deflection range available for a swivel movement for the front section 20 in relation to the rear section 12, which is limited between the two maximum amounts of swivel deflection, gradually decreases. This leads to a significantly increased security against the occurrence of contact between the front section 20, in particular the frame 23 of the same, and the rear section 12, in particular the operator's stand 14 of the same. This functionality is achieved in that the swivel-stop surfaces 52, 54 of the first swivel-stop formation become effective in the manner of cam surfaces, which are scanned by the swivel-stop fingers 72, 74 of the second swivel-stop formation 68 and form respective swivel stops 86, 88 in connection with them. The regions in which the swivel-stop surfaces 52, 54 on the one hand and the swivel-stop fingers 72, 74 on the other hand interact with each other and thus become effective as a swivel stop for a respective steering angle, change depending on the steering angle or the articulated deflection of the two joint parts 26, 28 in relation to each other, so that the interaction leading to the reduction of the maximum swivel deflection range is provided by the geometry of the two swivel-stop formations 50, 68 shown in FIGS. 3 to 8.

The invention claimed is:

1. An articulated/swivel joint for the articulated connection between a rear section and a front section of a construction machine, in particular a soil compactor, comprising a rear joint part, which is to be fitted on a rear section of a construction machine, a front joint part, which is to be fitted on a front section of a construction machine, and a joint mechanism, which couples the rear joint part to the front joint part in a jointed manner, wherein the joint mechanism couples the rear joint part and the front joint part in order to perform an articulated movement, which corresponds to a steering movement between the rear section and front section, and a swivel movement, which corresponds to a torsion movement between the rear section and front section, wherein the joint mechanism is assigned to a swivel-stop arrangement for limiting the swivel movement of the front joint part in relation to the rear joint part, wherein the swivel-stop arrangement comprises a first swivel stop for predetermining a first maximum amount of swivel deflection during deflection of the front joint part in relation to the rear joint part in a first swivel-movement direction and also comprises a second swivel stop for predetermining a second maximum amount of swivel deflection during deflection of the front joint part in relation to the rear joint part in a second swivel-movement direction, which is counter to the first swivel-movement direction, wherein the first maximum amount of swivel deflection and the second maximum amount of swivel deflection define a maximum swivel-deflection range for the swivel movement of the front joint part in relation to the rear joint part, wherein when an articulated movement is being performed, the maximum swivel-deflection range decreases as the amount of articulated deflection increases, starting from a neutral position of articulation of the front joint part in relation to the rear joint part.

2. Articulated/swivel joint according to claim 1, wherein when an articulated movement is being performed, the maximum swivel-deflection range continuously decreases as the amount of articulated deflection increases, starting from a neutral position of articulation.

3. Articulated/swivel joint according to claim 1, wherein in the case of the front joint part and the rear joint part positioned in the neutral position of articulation in relation to one another, the first maximum amount of swivel deflection and/or the second maximum amount of swivel deflection starting from a neutral position of swivel lies in the range from 8° to 15° and/or in that in the case of the front joint part and the rear joint part positioned in the neutral position of articulation in relation to one another, the maximum swivel-deflection range lies in the range from 20° to 27°.

4. Articulated/swivel joint according to claim 1, wherein in the case of an articulated deflection of the front joint part in relation to the rear joint part corresponding to a steering angle of 30°, the first maximum amount of swivel deflection and/or the second maximum amount of swivel deflection, starting from a neutral position of swivel of the front joint part in relation to the rear joint part lies in the range from 4° to 11° and/or in that in the case of the front joint part and the rear joint part are positioned at an articulated deflection of the front joint part in relation to the rear joint part corresponding to a steering angle of 30°, the maximum swivel-deflection range lies in a range from 12° to 19°.

5. Articulated/swivel joint according to claim 1, wherein the joint mechanism comprises:
   a coupling part articulated in the region of a first joint unit with the rear joint part and in the region of a second joint unit with the front joint part,
   a rear joint support to be extended from the rear joint part to the front joint part, a front joint support to be extended from the front joint part to the rear joint part and a third joint unit coupling in a distance direction of the front joint part in relation to the rear joint part the rear joint support between the first joint unit and the second joint unit and orthogonal to the distance direction at a distance from the first joint unit and the second joint unit articulated to the front joint support.

6. Articulated/swivel joint according to claim 5, wherein the first joint unit and/or the second joint unit and/or the third joint unit is designed in the manner of a ball joint.

7. Articulated/swivel joint according to claim 1, wherein the swivel-stop arrangement comprises:
   on a joint part of the front joint part and the rear joint part a first swivel-stop formation to be extended to the other joint part of the front joint part and the rear joint part with two swivel-stop surfaces oriented away from each other,
   on the other joint part a second swivel-stop formation to be extended to the one joint part and encompassing the first swivel-stop formation with two swivel-stop fingers in a fork-like manner,
   wherein each swivel-stop finger lies opposite one of the swivel-stop surfaces and provides a swivel stop therewith.

8. Articulated/swivel joint according to claim 7, wherein the first swivel-stop formation has a web region extending in the direction away from a joint part and, at an end region of the web region remote from a joint part a head region which is widened in relation to the web region, wherein the distance between the swivel-stop surfaces oriented away from each other is at least partially greater in the head region than in the web region.

9. Articulated/swivel joint according to claim 8, wherein at least in a part of the web region the distance between the swivel-stop surfaces oriented away from each other is substantially constant or changes in a longitudinal direction of the web region at a substantially constant rate.

10. Articulated/swivel joint according to claim 8, wherein in the head region the distance between the swivel-stop surfaces oriented away from each other increases from the web region to a maximum distance.

11. Articulated/swivel joint according to claim 7, wherein the mutual distance between the swivel-stop fingers in the direction away from the other joint part increases in a first extension region of the swivel-stop fingers and decreases in a second extension region of the swivel-stop fingers adjoining the first extension region.

12. Articulated/swivel joint according to claim 11, wherein starting from the neutral position of articulation with increasing articulation deflection of the front joint part in relation to the rear joint part, each swivel-stop finger of the second swivel-stop formation (68) in a region of the assigned swivel-stop surface closer to one joint part cooperates with this swivel-stop surface of the first swivel-stop formation to provide a respective swivel stop, and/or in that starting from the neutral position of articulation with increasing articulation deflection of the front joint part in relation to the rear joint part, each swivel-stop finger of the second swivel-stop formation cooperates with a region of the respective swivel-stop finger closer to the other joint part with the assigned swivel-stop surface of the first swivel-stop formation (50) to provide a respective swivel stop.

13. Articulated/swivel joint according to claim 12, wherein in the neutral position of the articulation each swivel-stop finger of the second swivel-stop formation cooperates in the region of its first extension region with the assigned swivel-stop surface in the region of the head region of the first swivel-stop formation (50) to provide a respective swivel stop, and/or in that in an articulation deflection of the front joint part in relation to the rear joint part corresponding to a steering angle of 30°, each swivel-stop finger of the second swivel-stop formation cooperates in the region of its second extension region with the assigned swivel-stop surface in the region of the web region of the first swivel-stop formation to provide a respective swivel stop.

14. Articulated/swivel joint according to claim 7, wherein the one joint part is the front joint part and the other joint part is the rear joint part.

15. Articulated/swivel joint according to claim 5, wherein the swivel-stop arrangement comprises:
- on a joint part of the front joint part and the rear joint part a first swivel-stop formation to be extended to the other joint part of the front joint part and the rear joint part with two swivel-stop surfaces oriented away from each other,
- on the other joint part a second swivel-stop formation to be extended to the one joint part and encompassing the first swivel-stop formation with two swivel-stop fingers in a fork-like manner, wherein each swivel-stop finger lies opposite one of the swivel-stop surfaces and provides a swivel stop therewith, and wherein the first swivel-stop formation and the second swivel-stop formation are disposed in a direction orthogonal to the distance direction (A) between the first joint unit and second joint unit on the one hand and the third joint unit on the other hand, and/or in that in relation to a direction (H) orthogonal to the distance direction (A), the swivel-stop surfaces of the first swivel stop formation are laterally oriented away from each other and/or the swivel-stop fingers of the second swivel-stop formation encompass the first swivel-stop formation laterally from the outside.

16. Construction machine, in particular a soil compactor, comprising a rear section and a front section connected to the rear section by means of an articulated/swivel joint according to claim 1.

17. Construction machine according to claim 16, wherein an operator's stand is provided on the rear section, wherein in a construction machine longitudinal direction (B) the operator's stand overlaps the articulated/swivel joint at least in some regions.

18. Construction machine according to claim 16, wherein at least one implement is provided on the front section, and/or in that a drive assembly is provided on the rear section.

* * * * *